United States Patent
Jung

[11] Patent Number: 5,863,993
[45] Date of Patent: Jan. 26, 1999

[54] PREPARATION METHOD OF POLYMERIC ROD AND GRADIENT-INDEX ROD LENS USING FREE RADICAL BULK POLYMERIZATION WITH TEMPERATURE GRADIENT

[75] Inventor: Sang-Don Jung, Daejeon, Rep. of Korea

[73] Assignee: Electronics and Telecommunications Research Institute, Rep. of Korea

[21] Appl. No.: 708,545

[22] Filed: Sep. 5, 1996

[30] Foreign Application Priority Data

Dec. 18, 1995 [KR] Rep. of Korea ................. 95-51480

[51] Int. Cl.$^6$ ................................ C08F 26/06
[52] U.S. Cl. ........................ 526/64; 526/259; 526/264; 526/291; 526/303.1; 526/319; 526/328; 526/346
[58] Field of Search .................. 526/64, 259, 264, 526/291, 303.1, 319, 328, 346

[56] References Cited

PUBLICATIONS

Koike et al. "Plastic axial gradient–index lens", Applied Optics, Vol. 24, No. 24. Dec. 1986.
"Light–focusing plastic rod prepared by photocopolymerization of methacrylic esters with vinyl benzoates" by Y. Ohtsuka et al, Applied Physics Letters, vol.29, No. 9, 1 Nov. 1976.

"Plastic axial gradient–index lens" by Koike et al; Applied Optics, 15 Dec. 1986, vol.24, No. 24.

*Primary Examiner*—David W. Wu
*Attorney, Agent, or Firm*—Nixon & Vanderhye

[57] ABSTRACT

A preparation method of polymerid rod using free radical bulk polymerization with temperature gradient, comprising the steps of, charging a mixture of monomer which can be subjected to a radical polymerization, polymerization initiator and cross linking agent into a reaction container of tube shape having a constant inner diameter and performing radical polymerization of the monomer, by passing the said reaction container in a constant dipping speed through a zone downwardly from upper part to lower part of the said zone, wherein the upper part of the zone is maintained at a relatively low temperature (TL) and the lower part of the zone is maintained at a relatively high temperature (TH) than that of the said upper part so that the medium part located between the upper part and lower part has a temperature gradient of (TH–TL)/L (wherein, L is defined as a vertical distance of the temperature-gradient zone). By the present method, it is possible to decrease a transmission loss of the obtained polymeric rod due to scattering. The obtained polymeric rod by the present method having nearly perfect outer shape can be used in preparing a polymeric gradient-index rod lens which is used as an optical component.

11 Claims, 2 Drawing Sheets

PREPARATION METHOD OF POLYMERIC ROD AND GRADIENT-INDEX ROD LENS USING FREE RADICAL BULK POLYMERIZATION WITH TEMPERATURE GRADIENT

BACKGROUND OF THE INVENTION

1. Field of the Invention

The present invention relates to a preparation method of polymeric rod and gradient index rod lens using free radical bulk polymerization with temperature gradient. More particularly, the present invention relates to a method for preparing polymeric rod having nearly perfect outer shape by free radical bulk polymerization with temperature gradient which enables significant decrease of transmission loss of polymeric rod caused by scattering, and a method for preparing a polymeric gradient-index rod lens employed as an optical component.

2. Description of the Prior Art

A polymeric gradient-index rod lens is generally employed in connection of optical fibers or connection between laser diode and optical fiber since it has an advantage of lowering connection loss.

Such polymeric gradient-index rod lens may be prepared from glass or polymer. Particularly, when using polymer, it is possible to produce polymeric gradient-index rod lens having various gradient-index due to diverse polymer types, while avoiding toxic preparation condition which has been a problem when using glass. Moreover, it is another advantageous aspect of using polymers to operate the process in a relatively low temperature of about 100° C., compared by excessively high temperature of 300° to 700° C. which is inevitable when using glass. For these reasons, recent studies have been focused on the preparation method using polymers [see Y. Koike, in Polymers for Lightwave and Integrated Optics, Edited by L. A. Hornak, Dekker (1993)].

Since a polymeric gradient-index of gradient-index rod lens largely depends on the geometric shape while the coarse surface and internal defects thereof may cause an transmission loss due to a scattering, it is essential to obtain a polymeric rod having perfect outer shape without internal flaws in order to prepare the above-mentioned polymeric gradient-index rod lens.

Almost all of the conventional preparation methods of a gradient-index rod lens use a free radical bulk polymerization in forming polymeric rod [see Y. Koike et al., *Appl. Opt.,* 24(24):4321–4325, 1985].

Although free radical bulk polymerization is advantageous in that the resultant polymer is not nearly contaminated as it is prepared directly from monomers, it is hard to control its polymerization rate due to an exothermic reaction, high activation energy and the difficulty in heat dissipation by gel effect, etc.

Also, as shown in Table 1, the density of polymer is higher than that of monomer, since the volume of a polymer decreases as a conversion of monomer into polymer proceeds and bubbles are generated at that amount. Such bubbles not only affect geometric shape of the polymeric rod but also cause transmission loss when they remain inside of the rod.

Despite said problems, there have been little effort in the prior art method for preparation of polymeric gradient-index rod lens to effectively remove the bubbles which are generated by volume change.

TABLE 1

Densities of the representative monomers and polymers[#]

| Monomers | Density (g/cm³) (25° C.) monomers | polymers | Volume change (%) |
|---|---|---|---|
| vinyl chloride | 0.919 | 1.406 | 34.4 |
| acrylonitrile | 0.800 | 1.17 | 31.0 |
| vinylidene chloride | 1.213 | 1.71 | 28.7 |
| methyl acrylate | 0.952 | 1.223 | 22.1 |
| methyl methacrylate | 0.940 | 1.179 | 20.6 |
| styrene | 0.905 | 1.062 | 14.6 |

[#]G. Odian, Principles of Polymerization, 3rd Ed., John Wiley & Sons, Inc., 1991.

Generally, as conversion of monomers into polymer proceeds, the viscosity increases gradually or rapidly. As seen in the attached FIG. 1, when monomers are homogeneously heated to proceed radical polymerization in the entire monomer solution, bubbles (3) generated by the density difference between monomer and polymer are fixed by prepolymer (1) or gel (2), and they cannot be released into the atmosphere and inevitably remained inside of the polymers. As higher the polymerization temperature, greater the addition amount of cross linking agent, and smaller the inner diameter, the amount of the residual bubbles present inside the polymers becomes large.

Meanwhile, as one of the most recent methods of preparing gradient-index rod lens, it is disclosed that a mixture of at least two monomers and polymerization initiator having different reaction rate and refractive index is placed in an optically transparent reaction tube and the photocopolymerization is carried out by moving the UV source upward in a vertical line while rotating the reaction tube [see: Y. Ohtsuka and I. Nakamoto, Appl. Phys. Lett., 29(9): 559–561, 1976].

However, the process of the aforementioned prior art is cumbersome since the reaction tube must be rotated. Another problem is that there are many possibilities of bubble generation during the procedure of completing polymerization of prepolymer or gel by heating to obtain solid polymer, which is common in the conventional method employing photocopolymerization reaction.

SUMMARY OF THE INVENTION

Accordingly, a primary object of the present invention is to provide a simple and economic preparation method of polymeric rod which has almost perfect outer shape without bubbles inside thereof so as to lower the transmission loss due to a scattering when used as an optical component.

It is another object of the present invention to provide a simple and economic preparation method of polymeric gradient-index rod lens which has almost perfect outer shape without bubbles inside thereof so as to lower the transmission loss due to a scattering when used as an optical component.

In accordance with the present invention, there is provided a method comprising the steps of, charging a mixture of monomer, polymerization initiator and cross linking agent into a reaction container of tube shape having a constant inner diameter and performing radical polymerization of the monomers, by passing the said reaction container in a constant dipping speed through a zone downwardly from upper part to lower part of the said zone, wherein the upper part of the zone is maintained at a relatively low temperature (TL) and the lower part of the zone is maintained at a relatively high temperature (TH) than that of the said upper part so that the medium part located between the upper part and lower part has a temperature gradient of (TH–TL)/L (wherein, L is defined as a vertical distance of the temperature-gradient zone).

The vertical distance, L has a value of L>0 mm and shorter the value, the bubbles can be easily removed since the space for prepolymer or gel having high viscosity decreases.

Also, the aforementioned temperatures TL and TH are maintained in the range of −20° C.<TL<TH<120° C. It is preferred that the TL is maintained in the range of −20° C. to 20° C. while TH in the range of 40° C. to 120° C.

As a monomer, it may be mentioned a compound which can be subjected to a radical polymerization such as ethylene, 1,3-diene, styrenes and its derivatives, halogenated olefins, vinyl esters, acrylates, methacrylates, acrylonitriles, acrylamides, N-vinyl carbazoles, and N-vinyl pyrrolidones.

As a polymerization initiator, it may be mentioned a compound which can generate radicals by thermal decomposition such as benzoyl peroxide, acetyl peroxide, lauryl peroxide, and azobisisobutyronitriles.

As a cross linking agent, it may be mentioned a compound such as dicumyl peroxide, di-t-butyl peroxide, ethylene glycol dimethacrylate, and vinylic cross linking agent such as divinylbenzene which participates in a radical polymerization and functions as a cross linking agent.

The addition amounts of the polymerization initiator and cross linking agent are up to 5 wt. % and 100 wt. %, respectively (these amounts do not contain zero), based on the weight of the monomer used.

Although the optimal dipping speed of the reaction container depends upon the monomer type, content of the polymerization initiator, TL and TH, it may be fall into a range of 1 mm/hr to 100 mm/hr.

A preferred embodiment of the preparation method of polymeric gradient-index rod lens according to the present invention to achieve the aforementioned object comprises the steps of, charging a mixture of monomer, polymerization initiator and cross linking agent into a reaction container of tube shape having a constant inner diameter; performing radical polymerization of the monomers to obtain polymeric rod, by dipping the said reaction container in a constant speed through a zone downwardly, i.e., from upper part to lower part of the said zone, wherein the upper part of the zone is maintained at a relatively low temperature (TL) and the lower part of the zone is maintained at a relatively high temperature (TH) than that of the said upper part so that the medium part located between the upper part and lower part has a temperature gradient of (TH–TL)/L (wherein, L is defined as a vertical distance of the temperature-gradient zone); swelling the obtained polymeric rod by immersing it in an organic solvent; and performing a chemical reaction by diffusing through inside the rod, a compound which can produce a polymer having relatively low refractive index than that of the said polymer, by the chemical reaction with the polymer forming the rod.

Alternatively, it is another embodiment of the preparation method according to the present invention to prepare poly-gradient-index rod lens which comprises the steps of, charging a mixture of monomer having relatively rapid polymerization speed and high refractive index, monomer which is easily mixed with the above monomer without phase separation and has relatively slow polymerization speed than that of the said monomer and low refractive index, polymerization initiator and cross linking agent into a reaction container having a constant inner diameter and performing radical polymerization of the monomers to obtain polymeric rod, by dipping the said reaction container in a constant speed through a zone downwardly from upper part to lower part of the said zone, wherein the upper part of the zone is maintained at a relatively lower temperature (TL) and the lower part of the zone is maintained at a relatively high temperature (TH) than that of the said upper part so that the medium part located between the upper part and lower part has a temperature gradient of (TH–TL)/L (wherein, L is defined as a vertical distance of the temperature-gradient zone).

As the aforementioned monomers, it can be used at least three monomers which can be mixed well without phase separation and having different polymerization rate and refractive index from each other.

DETAILED DESCRIPTION OF THE INVENTION

Figure 2:
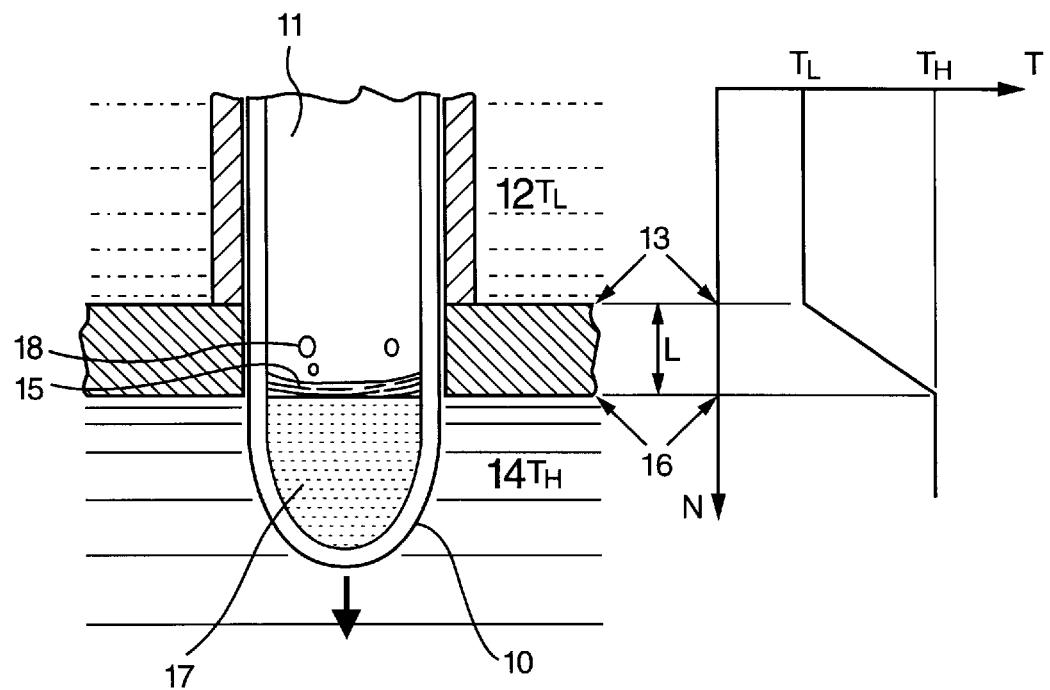
FIG. 2 illustrates an embodiment of a polymerization procedure according to the present invention.

As shown in FIG. 2, according to the present invention, monomers (11) charged in a tube-shaped reaction container (10) are gradually heated while passing by the lowest point (13) of the part maintained at a low temperature (TL) to proceed gradual polymerization at the temperature gradient zone and via a formation of prepolymer or gel (15), then the monomers are converted to a polymer (17) of solid state at near the highest point (16) of the part maintained at a high temperature (TH) to finally obtain a polymeric rod. The temperature distribution is represented at the right part of the FIG.

Since the bubbles (18) generated during the conversion of monomers (11) into a solid polymer (17) in the process for preparation of the polymeric rod according to the present invention have a relatively high temperature than that of the part (12) maintained at a low temperature (TL), the density of the bubbles decreases and as a result, the bubbles become to have buoyancy.

Also, according to the present process, as the viscous prepolymer or gel (15) are present in only a restricted region, buoyant bubbles (18) can easily pass through the prepolymer or gel (15).

Bubbles which have passed through the prepolymer or gel (15) then, can move more easily through the monomers (11) which have excessively low viscosity and released into the atmosphere to obtain polymeric rod which has little bubbles inside thereof.

Additionally, by using the preparation method of polymeric rod of the present invention, it becomes possible to produce a polymeric rod whose cross linking degree reaches nearly 100%, which is a significantly excellent feature compared with that of those obtained by the extrusion method commercially employed.

The preparation method of polymeric rod and the preparation method of polymeric gradient-index rod lens by applying chemical diffusion to the obtained polymer rod will be more clearly understood with reference to the following examples which are set forth to illustrate, but are not to be construed to limit the present invention.

EXAMPLE 1

A mixed solution of 10 g of styrene monomer, 0.04 g of benzoylperoxide as polymerization initiator and 0.4 g of divinylbenzene as cross linking agent was charged into a glass tube of 70 mm long (inner diameter: 1 mm). The glass tube was passed through downward a reaction instrument whose upper part being maintained at a low temperature of 0° C. and lower part maintained at a high temperature of 90° C. so that the zone having vertical distance of 10 mm between the upper part and lower part has a temperature gradient of 9° C./mm, in order to produce cross linked polystyrene rod. The dipping speed of the glass tube was varied within 3–9 mm/hr.

Comparative Example 1

Figure 1:
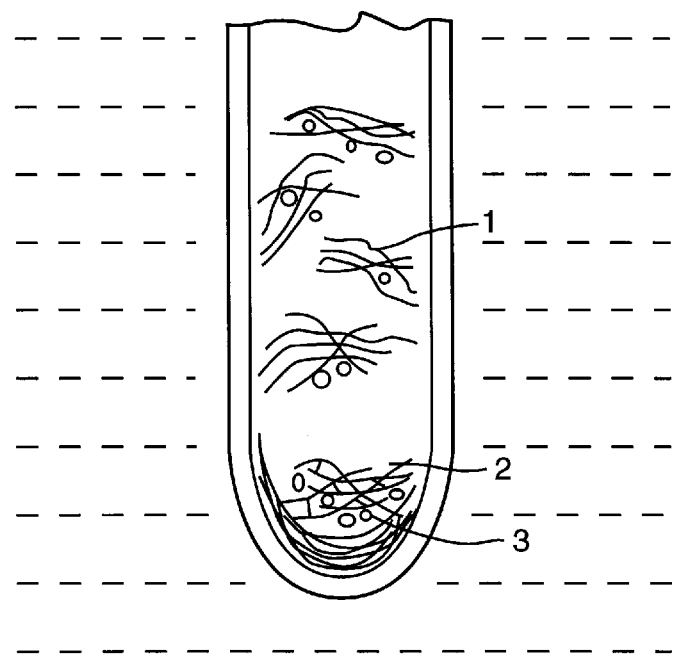
FIG. 1 illustrates a polymerization procedure according to a prior art for producing polymeric rod by homogeneous heating.

The mixed solution of Example 1 was charged into a same reaction instrument of Example 1 and polymerization was conducted by homogeneous heating at 90° C. for 4 hours as illustrated in FIG. 1 to obtain cross linked polystyrene rod.

The bubbles generated in the polymeric rod and non-homogeneous outer shape of polymeric rod caused by such bubbles in Example 1 and Comparative Example 1 were evaluated by measuring transmission loss thereof as described below.

Figure 3:
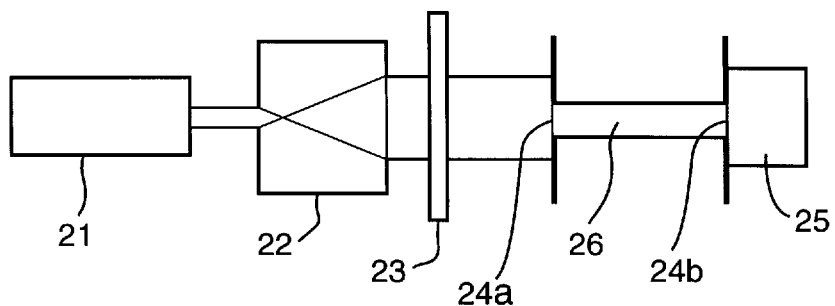
FIG. 3 shows a measuring apparatus for determining transmission loss of the polymeric rod prepared by the method of the present invention.

First, polymeric rods obtained from Example 1 and Comparative Example 1 were cut to 25 mm long and the both cut area were ground. The transmission loss of laser beam as passing through the cut area ground by the same roughness of 0.05 $\mu$m was measured by an instrument as illustrated in FIG. 3. The instrument of FIG. 3 for measurement of transmission loss is equipped with He—Ne laser (21), collimator (22), ND filter (23) and sample plate having apertures (24a, 24b) in its both side, and power meter (25). The polymeric rod (26) was placed onto the sample plate.

Figure 4:
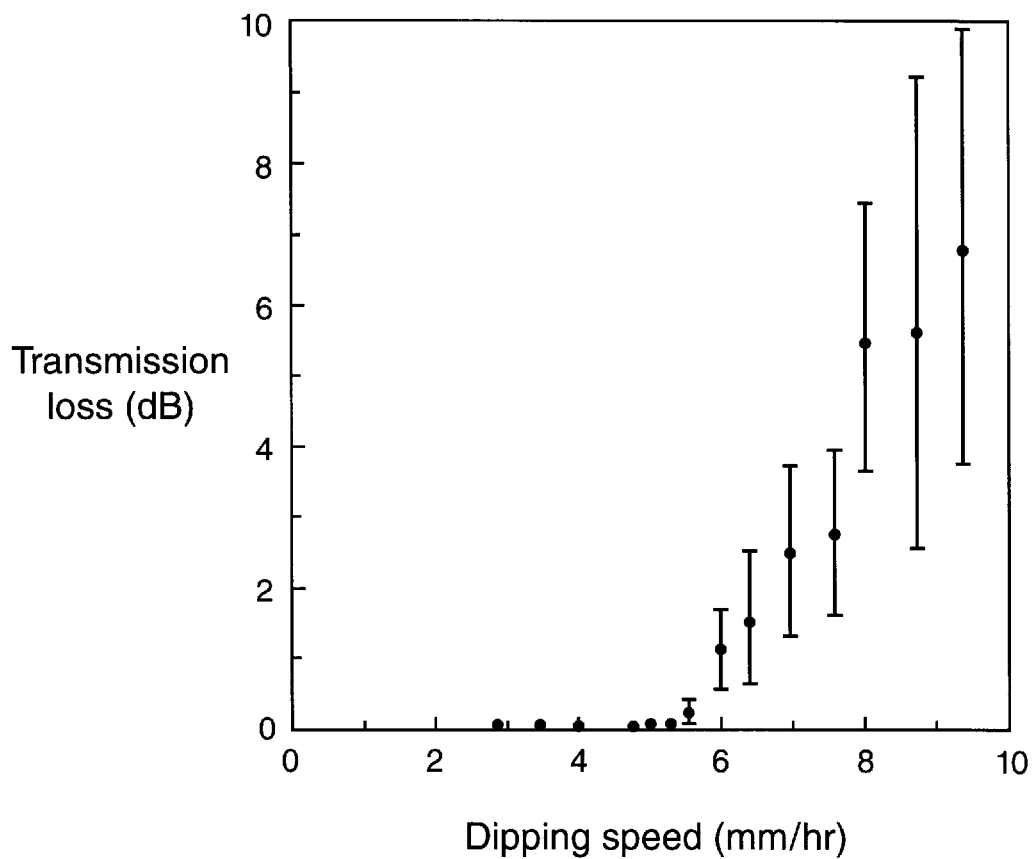
FIG. 4 is a graph plotting transmission loss versus dipping speed of the polymeric rod prepared by the method of the present invention.

FIG. 4 illustrates transmission loss depending on the dipping speed of polymeric rod as obtained from Example 1, wherein the transmission loss is defined as a ratio of light intensity with polymeric rod to that without polymeric rod.

It is apparent as seen in FIG. 4 that faster the dipping speed of the reaction container, greater the transmission loss becomes and as a result, the remaining amount of bubbles is greater or the surface becomes coarse.

The transmission loss of polymeric rod obtained by Comparative Example 1 was about 8 dB (25 mm), which was much greater than 0.5 dB or less of polymeric rod of Example 1 which was obtained with the dipping speed slower than 5 mm/hr.

EXAMPLE 2

A mixed solution of 10 g of styrene monomer, 0.04 g of benzoylperoxide as polymerization initiator and 1.0 g of divinylbenzene as cross linking agent was charged into a glass tube of 70 mm long (inner diameter: 1 mm). The glass tube was passed through downward a reaction instrument in a dipping speed of 4 mm/hr whose upper part being maintained at a low temperature of 0° C. and lower part maintained at a high temperature of 90° C. so that the zone having vertical distance of 10 mm between the upper part and lower part has a temperature gradient of 9° C. /mm, in order to produce cross linked polystyrene rod. The glass tube was removed by immersing it into an aqueous solution of hydrofluoric acid and swelling was conducted in tetrahydrofuran for 2 hours. The swollen and cross-linked polystyrene rod was immersed in sulfuric acid maintained at 60° C. for 0.5–1.5 hours so that sulfuric acid can be diffused into the inside of polystyrene rod to finally obtain a polymeric gradient-index rod lens.

In the aforementioned diffusion process, sulfuric acid is diffused into the inside of the swollen and cross linked polystyrene rod and converts polystyrene to polystyrene sulfide by reacting with polystyrene. The refractive index of polystyrene sulfide decreases as sulfurization proceeds. As sulfuric acid penetrates into the polymeric rod by diffusion, sulfurization occurs most vigorously at the surface of the rod and most weakly in the core of the rod. Therefore, a refractive index gradient is obtained wherein the value is lowest at the surface of the rod and highest at the core of the rod. A concrete gradient-index varies according to the temperature and time of the sulfurization.

In the meantime, it is possible to apply a copolymerization method used in the conventional preparation method of polymeric gradient-index rod lens to the preparation method of polymeric rod according to the present invention which employs free radical bulk polymerization with temperature gradient.

That is, in case applying the preparation method of polymeric rod according to the present invention which employs free radical bulk polymerization with temperature gradient, after charging a mixture of monomer having relatively rapid polymerization speed and high refractive index, monomer having relatively slow polymerization speed than that of the said monomer and low refractive index, polymerization initiator and cross linking agent into a reaction container, the polymerization primarily proceeds near the inner wall of the reaction container where accordingly, the polymerization of monomers mainly occurred, since inner wall of the reaction container was first heated. Each monomer must be well mixed without phase separation. As monomers of high polymerization speed are consumed rapidly, the concentration of monomers of low polymerization speed and low refractive index becomes high at the core of the reaction container where the polymerization occurs later, so that the monomers of low polymerization speed and low refractive index are mainly polymerized.

Consequently, polymer having relatively high refractive index is formed at the surface of the polymerized rod and polymer having relatively low refractive index is formed at the core of the polymeric rod. Thus a refractive index distribution wherein the refractive index becomes highest at the surface of the rod and lowest at the core of the rod is resulted. Such refractive index distribution varies depending on the relative composition ratio of monomers, content of polymerization initiator, temperature, and dipping speed of a reaction container, etc.

The preparation method of polymeric gradient-index rod lens according to the present invention using free radical bulk copolymerization with temperature gradient is a simple method since it need not rotate the reaction container which is necessary in the conventional method using photocopolymerization.

Moreover, while there are many possibilities of bubbles generation during the stage of polymerizing prepolymer or gel completely by heating to obtain solid polymer in the conventional photocopolymerization method, there is no need to heat again the polymeric rod in the present preparation method of polymeric gradient-index rod lens which employs free radical bulk copolymerization with temperature gradient, since the solid polymer is dipped continuously in the part maintained at a high temperature until the polymerization is completed.

As described in detail hereinbefore, since the preparation method of polymeric rod according to the present invention using free radical bulk polymerization with temperature gradient can provide a polymeric rod having nearly complete outer shape without any remaining bubbles inside thereof, in a simple and economic way, it is possible to significantly decrease transmission loss occurred by scattering when used as optical component, and to enhance production yield of polymeric gradient-index rod lens.

It is also confirmed that the preparation method of polymeric gradient-index rod lens according to the present invention can provide in a simple and economic way, a polymeric gradient-index rod lens having nearly complete outer shape and no remaining bubbles inside thereof so that transmission loss occurred by scattering during its use can be largely decreased.

What is claimed is:

1. A method of preparing a polymeric rod comprising the steps of:
   (a) charging a mixture of a radically polymerizable monomer, a polymerization initiator and a cross linking agent into a tube shape reaction container having a constant inner diameter,
   (b) polymerizing the monomer by radical polymerization, and
   (c) passing the reaction container in a constant downward dipping speed through a zone from an upper part to a lower part of the said zone, wherein the upper part of the zone is maintained at a first temperature (TL) and the lower part of the zone is maintained at a second temperature (TH) higher than that of the upper part providing a temperature gradient located between the upper part and lower part in which the temperature gradient is (TH−TL)/L where L is a vertical distance of the temperature-gradient zone.

2. The method according to claim 1, wherein the said temperatures TL and TH are in the range of −20° C.<TL<TH<120° C.

3. The method according to claim 2, wherein the TL is in the range of −20° to 20° C. and TH is in the range of 40° C. to 120° C.

4. The method according to claim 1, wherein the monomer is a compound which can be subjected to a radical polymerization, selected from the group consisting of ethylene, styrenes, halogenated olefins, vinyl esters, acrylates, methacrylates, acrylonitriles, acrylamides, N-vinyl carbazoles, and N-vinyl pyrrolidones.

5. The method according to claim 1, wherein the polymerization initiator is a compound which can generate radicals by a thermal decomposition, selected from the group consisting of benzoyl peroxide, acetyl peroxide, lauryl peroxide, and azobisisobutyronitriles.

6. The method according to claim 1, wherein the cross linking agent is selected from the group consisting of dicumyl peroxide, di-t-butyl peroxide, ethylene glycol dimethacrylate, and a vinylic cross linking agent.

7. The method according to claim 1, wherein the polymerization initiator is added in an amount of up to 5 wt. % excluding zero, based on the weight of the monomer used.

8. The method according to claim 1, wherein the cross linking agent is added in an amount of up to 100 wt. % (this amount does not contain zero) based on the weight of the monomer used.

9. The method, according to claim 1, wherein the dipping speed of the reaction container is in the range of 1 mm/hr to 100 mm/hr.

10. The method according to claim 6, wherein the vinyl cross linking agent is divinylbenzene.

11. A polymeric rod produced by the method of claim 1.

* * * * *